US011955886B2

(12) United States Patent
Tang

(10) Patent No.: US 11,955,886 B2
(45) Date of Patent: Apr. 9, 2024

(54) SAFETY LOW-VOLTAGE ELECTRIC APPLIANCE SUPPLIED WITH POWER BY ENERGY STORAGE SYSTEM

(71) Applicant: Shenzhen JinDian Electronic Technology Co., Ltd., Shenzhen (CN)

(72) Inventor: Shifu Tang, Shenzhen (CN)

( * ) Notice: Subject to any disclaimer, the term of this patent is extended or adjusted under 35 U.S.C. 154(b) by 0 days.

(21) Appl. No.: 18/304,299

(22) Filed: Apr. 20, 2023

(65) Prior Publication Data
US 2023/0344337 A1     Oct. 26, 2023

(30) Foreign Application Priority Data

Apr. 22, 2022  (CN) ......................... 202210429776.X

(51) Int. Cl.
*H02M 3/125* (2006.01)
*H02J 1/00* (2006.01)

(52) U.S. Cl.
CPC ............... *H02M 3/125* (2013.01); *H02J 1/00* (2013.01)

(58) Field of Classification Search
CPC ........ H02J 3/28; H02J 3/38; H02J 7/34; H02J 1/00; H02J 2207/10; H02J 1/14; H02M 3/125
See application file for complete search history.

(56) References Cited

U.S. PATENT DOCUMENTS

2014/0078622 A1* 3/2014 Crane ................. H01H 33/596
                                                                    361/8
2019/0267810 A1* 8/2019 Johns ....................... H02B 7/06

FOREIGN PATENT DOCUMENTS

CN           109149639 A       1/2019

* cited by examiner

*Primary Examiner* — Hal Kaplan
*Assistant Examiner* — Rasem Mourad
(74) *Attorney, Agent, or Firm* — Novoclaims Patent Services LLC; Mei Lin Wong

(57) ABSTRACT

A safety low-voltage electric appliance supplied with power by an energy storage system comprises: a multi-energy power supply monitoring and recognizing unit used for integrating power interfaces for multi-energy power supply, and monitoring and tracking a multi-energy state; an energy storage region dynamic energy level unit used for dividing a multi-energy storage region into energy storage regions in terms of an energy storage form and specification, and adjusting energy levels of the dynamic energy storage regions; a multi-energy power supply and storage conversion unit used for controlling electric energy transmission, converting electric energy of the multi-energy power supply into electric energy needed by DC-operated load terminals, and storing the energy storage region dynamic energy level unit; and a low-voltage direct supply safety protection and stabilization unit used for monitoring an electricity consumption state of the load terminals, and performing safety protection on the load terminals.

8 Claims, 4 Drawing Sheets

SAFETY LOW-VOLTAGE ELECTRIC APPLIANCE SUPPLIED WITH POWER BY ENERGY STORAGE SYSTEM

CROSS REFERENCE OF RELATED APPLICATION

This is a non-provisional application which claimed priority of Chinese application number 202210429776.X, filing date Apr. 22, 2022. The contents of these specifications are incorporated herein by reference.

BACKGROUND OF THE PRESENT INVENTION

The invention relates to the technical field of multi-new energy power supply, and particularly relates to a safety low-voltage electric appliance supplied with power by an energy storage system.

DESCRIPTION OF RELATED ARTS

At present, power interfaces for multi-energy power supply have not be integrated yet, and how to divide energy storage regions in terms of an energy storage form and specification, how to convert electric energy of multi-energy power supply into electric energy needed by DC-operated load terminals, how to monitor the electricity consumption state of the load terminals, how to realize safety protection of the load terminals, and how to balance and stabilize inter-regional power supply of the load terminals in a region are problems to be solved for multi-energy power supply. Thus, it is necessary to provide a safety low-voltage electric appliance supplied with power by an energy storage system to solve at least part of the problems in the prior art.

SUMMARY OF THE PRESENT INVENTION

A series of concepts in a simplified form are introduced in the brief summary of the invention, and will be described in further detail in the detailed description of the invention. The brief summary of the invention is neither intended to limit key features and necessary technical features of technical solutions to be protected by the invention, nor intended to determine the protection scope of the technical solutions to be protected by the invention.

To solve at least part of the aforementioned problems, the invention provides a safety low-voltage electric appliance supplied with power by an energy storage system, which comprises:

A multi-energy power supply monitoring and recognizing unit used for integrating power interfaces for multi-energy power supply, and monitoring and tracking a multi-energy state;

An energy storage region dynamic energy level unit used for dividing a multi-energy storage region into energy storage regions in terms of an energy storage form and specification, and adjusting energy levels of the dynamic energy storage regions based on power supply state analysis;

A multi-energy power supply and storage conversion unit used for controlling electric energy transmission, converting electric energy of the multi-energy power supply into electric energy needed by DC-operated load terminals, and storing the energy storage region dynamic energy level unit; and A low-voltage direct supply safety protection and stabilization unit used for monitoring an electricity consumption state of the load terminals, performing safety protection on the load terminals, and realizing balanced and stable inter-regional power supply of power supply terminals in a region.

Preferably, the multi-energy power supply monitoring and recognizing unit comprises:

A multi-energy integrated interface sub-unit used for integrating the power interfaces for the multi-energy power supply to obtain a multi-energy integrated interface;

An energy power supply state detection sub-unit used for detecting an energy power supply state of the multi-energy integrated interface to obtain energy power supply state detection information; and A multi-energy monitoring, recognizing and tracking sub-unit used for recognizing the energy power supply state detection information, and monitoring and tracking the multi-energy state.

Preferably, the energy storage region dynamic energy level unit comprises:

A multi-energy storage region planning sub-unit used for dividing the multi-energy storage region in terms of the energy storage form and specification to obtain the dynamic energy storage regions;

An energy storage region peak-valley analysis sub-unit used for detecting a peak-valley power supply state of the multi-energy power supply, and performing power supply state analysis on the peak-valley power supply state; and A dynamic region energy level adjustment sub-unit used for adjusting the energy levels of the dynamic energy storage regions based on the power supply state analysis.

Preferably, the multi-energy power supply and storage conversion unit comprises:

A multi-energy power supply energy transmission sub-unit used for transmitting the electric energy of the multi-energy power supply to the energy storage region dynamic energy level unit, and transmitting electric energy stored in the energy storage region dynamic energy level unit to the load terminals;

A supply and storage conversion control center sub-unit used for controlling electric energy transmission of the multi-energy power supply energy transmission sub-unit and a direct-supply energy storage and power supply conversion sub-unit; and The direct-supply energy storage and power supply conversion sub-unit used for converting the electric energy of the multi-energy power supply into the electric energy needed by the DC-operated load terminals according to the control of the supply and storage conversion control center sub-unit, and storing the energy storage region dynamic energy level unit.

Preferably, the low-voltage direct supply safety protection and stabilization unit comprises:

A load terminal monitoring and feedback sub-unit used for monitoring the electricity consumption state of the load terminals, and feeding a monitoring result back to the multi-energy power supply and storage conversion unit;

A terminal low-voltage direct supply safety protection sub-unit used for performing safety protection on the load terminals according to power supply of the multi-energy power supply and storage conversion unit; and A terminal region power supply stabilization unit used for realizing balanced and stable inter-regional power supply of the power supply terminals in the region.

Preferably, the multi-energy integrated interface sub-unit comprises:
  A multi-energy power supply connection sub-unit to be connected to an electric-physical-chemical energy storage system to obtain a multi-energy power supply connection, the multi-energy power supply connection comprising a solar power generation connection, a wind power generation connection, and a tidal power generation connection;
  A battery input power supply connection sub-unit to be connected to an input terminal of a storage battery with an end passing through and being connected to a charging control and protection circuit; and
  A multi-energy power generation integrated interface sub-unit used for integrating the multi-energy power supply connection, the input terminal of the storage battery, and initial input terminals of the load terminals to a uniform interface to form a multi-energy power generation integrated interface.

Preferably, the multi-energy monitoring, recognizing and tracking sub-unit comprises:
  An energy power supply recognizing and storage sub-unit used for recognizing the energy power supply state detection information, and transmitting multi-energy power to a storage battery of a low-voltage energy storage system through a low voltage-to-low voltage conversion circuit according to a recognized power supply type;
  A low-voltage energy storage moving and adjusting sub-unit used for dynamically moving and adjusting the low-voltage energy storage system when the multi-energy power supply state is "in urgent need"; and
  A process multi-energy monitoring and tracking sub-unit used for monitoring and tracking the multi-energy state in the process of transmitting the electric energy of the multi-energy power supply to the storage battery of the low-voltage energy storage system and dynamically moving and adjusting the low-voltage energy storage system.

Preferably, the multi-energy storage region planning sub-unit comprises:
  A feature-based energy storage region sub-unit used for establishing feature-based energy storage regions according to features of the multi-energy power supply, the feature-based storage regions comprising a solar feature-based energy storage region, a wind feature-based energy storage region, and a tidal feature-based energy storage region;
  A region specification-based energy storage region dividing unit used for dividing the feature-based energy storage regions into adjustable energy storage regions in terms of an energy region specification; and
  An energy fluctuation dynamic adjustment sub-unit used for dynamically adjusting the adjustable energy storage regions by an energy fluctuation law to obtain the dynamic energy storage regions.

Preferably, the supply and storage conversion control center sub-unit comprises:
  An electric energy multi-way transmission sub-unit used for realizing multi-way transmission of electric energy of the multi-energy power supply energy transmission sub-unit, the multi-way transmission comprising multi-path transmission, multi-relay point transmission, long-distance transmission and short-distance transmission;
  A transmission center sub-unit used for establishing a transmission center for the multi-way transmission, the transmission center comprising a multi-path transmission center, a multi-relay point transmission center, a long-distance transmission center and a short-distance transmission center;
  A power supply conversion central control sub-unit used for central control of the direct-supply energy storage and power supply conversion sub-unit, and comprising multiple energy storage region dynamic current transformers, multiple distributed energy storage controllers and a central controller, wherein the central controller communicates with the multiple distributed energy storage controllers; each energy storage region dynamic current transformer comprises a central transformation unit and at least one dynamic energy storage region, the dynamic energy storage region comprises a first adjustable energy storage region, a second adjustable energy storage region, a first gate thyristor group and a second gate thyristor group, the first gate thyristor group is connected in series between the first adjustable energy storage region and a DC side of a power electronic transformation unit, and the first adjustable energy storage region and the power electronic transformation unit are connected or disconnected by controlling forward on-off and reverse on-off of the first gate thyristor group; the second gate thyristor group is connected in series between the power electronic transformation unit and a DC grid, and the power electronic transformation unit and the DC grid are connected or disconnected by controlling forward on-off and reverse on-off of the second gate thyristor group; and the second adjustable energy storage region and the first adjustable energy storage region are connected in parallel with the first gate thyristor group.

Preferably, the terminal region power supply stabilization sub-unit comprises:
  A regional power supply sub-unit used for regional power supply to the power supply terminal in the region;
  A regional power supply switching sub-unit used for inter-regional power supply switching of the regional power supply; and
  A regional power supply balancing sub-unit used for realizing balanced and stable inter-regional power supply during the inter-regional power supply switching process, and comprising multiple groups of input terminals, multiple groups of energy storage inductors, a centralized and decentralized reference ground potential terminal, multiple groups of thyristors, a bidirectional rectifying circuit, multiple groups of energy storage regions, and a one-superior and multi-inferior control center, wherein each group of input terminals is connected to multiple power supply regions; the multiple groups of energy storage inductors are connected to the multiple groups of input terminals respectively to store and release electric energy; the centralized and decentralized reference ground potential terminal is connected to the multiple power supply regions; the multiple groups of thyristors correspond to the multiple groups of energy storage inductors respectively, one end of each group of thyristors is electrically connected to the other end, other than an end connected to the corresponding input terminal, of the corresponding energy storage inductor, and the other end of each group of thyristors is electrically connected to the reference ground potential terminal; the bidirectional rectifying circuit is electrically connected to a connection node of the multiple groups of thyristors and the corresponding energy storage inductor; each energy storage region has a positive collection terminal and a negative collection terminal, the negative collection terminal of one said energy storage region is connected to the positive collection terminal of another said energy storage region through a controllable switch to form the connection node, which is connected to the reference ground potential terminal, and the positive collection terminals and negative collection terminals, that are not connected, of the multiple groups of energy storage regions are connected to the multiple groups of thyristors through the bidirectional rectifying circuit; the one-superior and multi-inferior control center is connected to the multiple groups of thyristors, and enables the multiple groups of energy storage inductors to store electric energy from the multiple groups of input terminals and release electric energy to the corresponding energy storage regions by turning on or off the multiple groups of thyristors; when electric energy in one said energy storage regions is sufficient, the corresponding group of thyristors is turned off; when electric energy in one said energy storage regions is sufficient and electric energy is needed by the load terminals, the corresponding group of thyristors is controlled to be turned on reversely, and then, the energy storage region releases electric energy to the load terminals, such that balanced and stable inter-regional power supply is realized during the switching process.

Compared with the prior art, the invention has at least the following beneficial effects:

The safety low-voltage electric appliance supplied with power by an energy storage system comprises the multi-energy power supply monitoring and recognizing unit used for integrating power interfaces for multi-energy power supply, and monitoring and tracking a multi-energy state, the energy storage region dynamic energy level unit used for dividing a multi-energy storage region into energy storage regions in terms of an energy storage form and specification, and adjusting energy levels of the dynamic energy storage regions based on power supply state analysis, the multi-energy power supply and storage conversion unit used for controlling electric energy transmission, converting electric energy of the multi-energy power supply into electric energy needed by DC-operated load terminals, and storing the energy storage region dynamic energy level unit, and the low-voltage direct supply safety protection and stabilization unit used for monitoring an electricity consumption state of the load terminals, performing safety protection on the load terminals, and realizing balanced and stable inter-regional power supply of power supply terminals in a region; an energy storage system with safety voltage may be used for supplying power, the energy storage system may be one or a combination of electrochemical energy storage systems such as a solar power generation system, a wind power generation system, and a tidal power generation system, an independent storage battery/mains supply may be used for charging, or both the mains supply and the energy storage system may be used for complementation; the load terminals not only comprise lamps, but also can be expanded to various electric products; the low-voltage electric appliance does not need an independent external or internal mains supply-to-low voltage conversion circuit, and can be realized by means of a low voltage-to-low voltage conversion circuit, thus being lower in cost, more reliable, and safer; and it is unnecessary to invert the voltage of the energy storage system into mains supply and then convert the mains supply into low voltage, so the use efficiency of the electric energy of the low-voltage energy storage system is high.

Other advantages, purposes and features of the safety low-voltage electric appliance supplied with power by an energy storage system provided by the invention will be reflected in the following description, and part of these advantages, purposes and features will be understood by those skilled in the art based on study and practice of the invention.

BRIEF DESCRIPTION OF THE DRAWINGS

The drawings aim to provide a further understanding of the invention and are used to explain the invention together with embodiments of the invention as one part of the specification, but these drawings are not intended to limit the invention. In the drawings.

DETAILED DESCRIPTION OF THE PREFERRED EMBODIMENT

Figure 1:
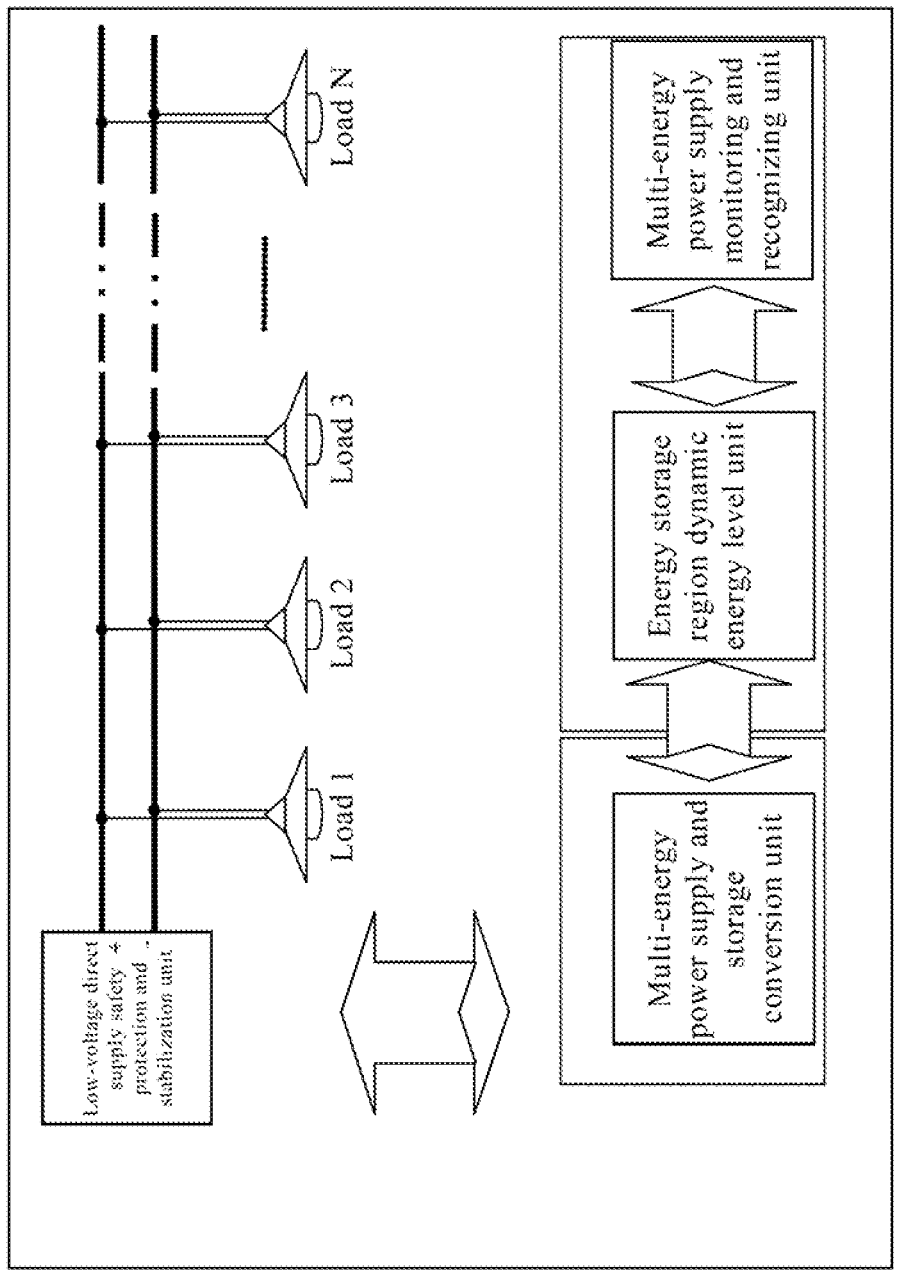
FIG. 1 is an overall block diagram of a safety low-voltage electric appliance supplied with power by an energy storage system according to the invention.
Figure 2:
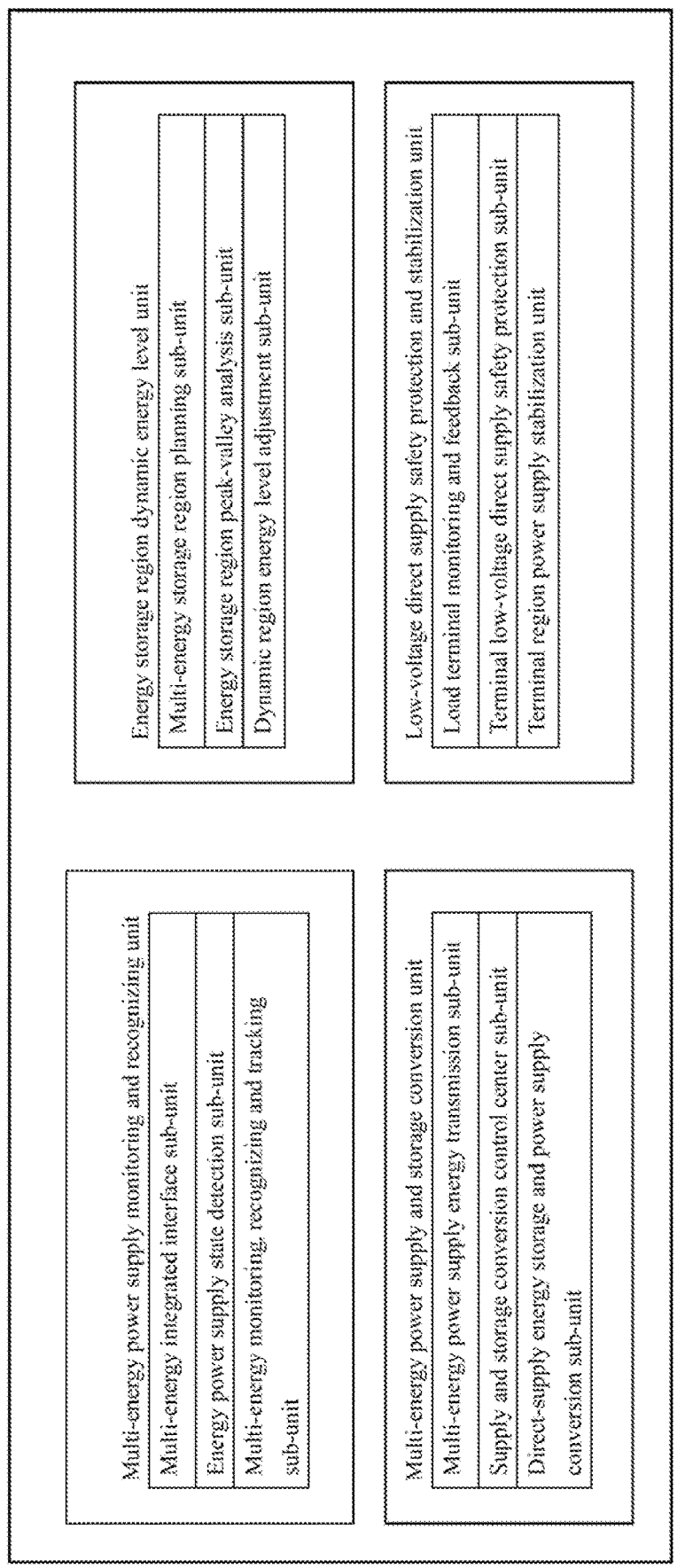
FIG. 2 is a block diagram of units of the safety low-voltage electric appliance supplied with power by an energy storage system according to the invention.
Figure 3:
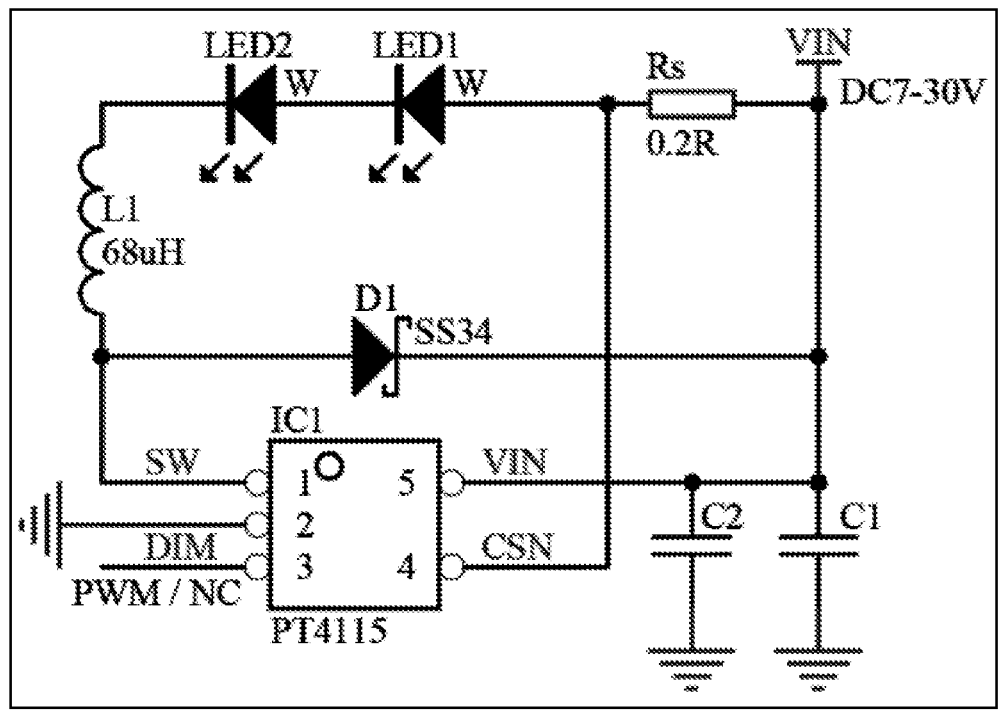
FIG. 3 is a diagram of one embodiment of the safety low-voltage electric appliance supplied with power by an energy storage system according to the invention.
Figure 4:
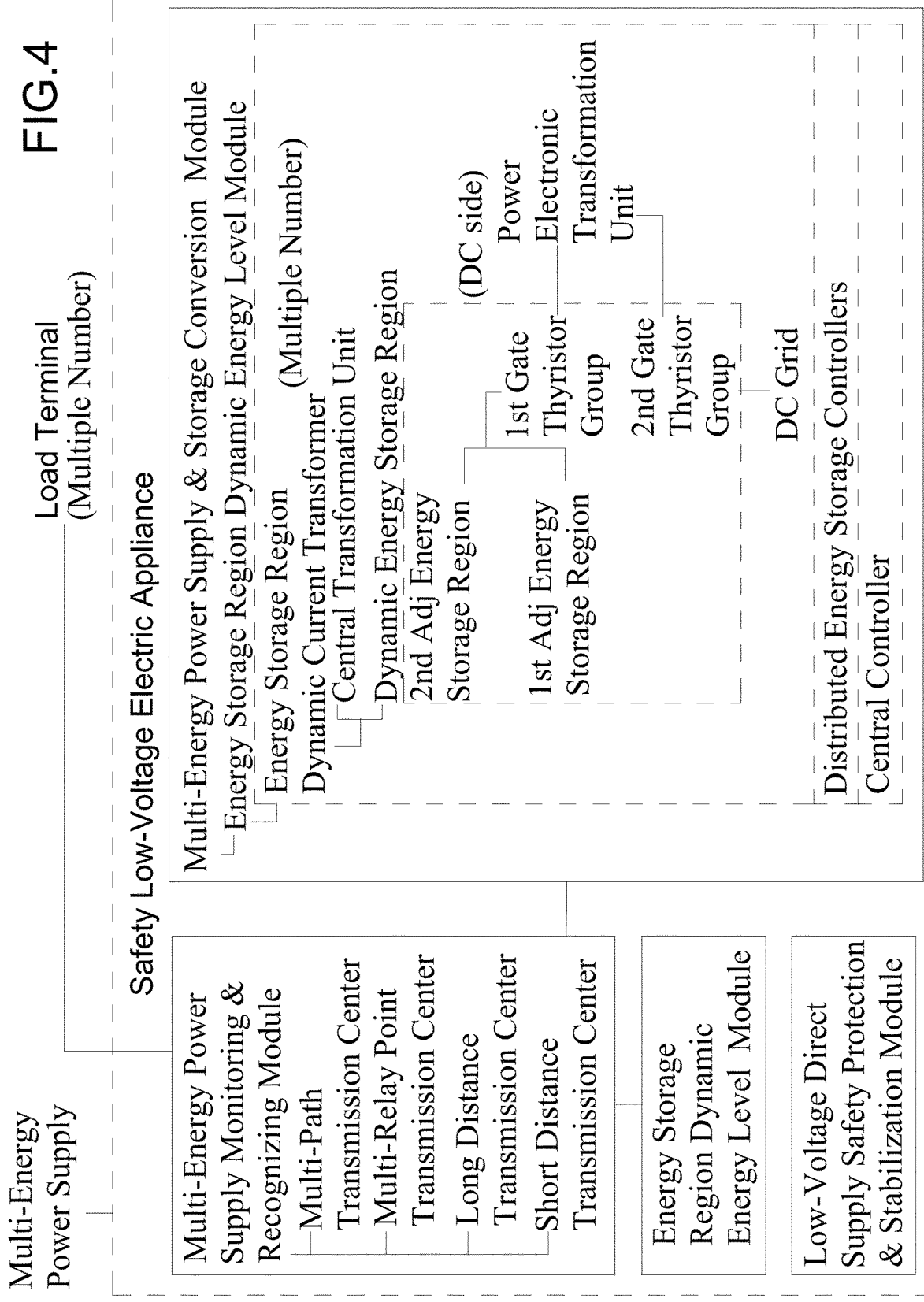
FIG. 4 is a schematic diagram showing the safety low-voltage electric appliance according to a preferred embodiment of the present invention.

The invention will be described in further detail below in conjunction with the accompanying drawings and embodiments, such that those skilled in the art can implement the invention with reference to the specification. As shown in FIG. 1-FIG. 4, the invention provides a safety low-voltage electric appliance supplied with power by an energy storage system, which comprises A multi-energy power supply monitoring and recognizing unit used for integrating power interfaces for multi-energy power supply, and monitoring and tracking a multi-energy state;

An energy storage region dynamic energy level unit used for dividing a multi-energy storage region into energy storage regions in terms of an energy storage form and specification, and adjusting energy levels of the dynamic energy storage regions based on power supply state analysis;

A multi-energy power supply and storage conversion unit used for controlling electric energy transmission, converting electric energy of the multi-energy power supply into electric energy needed by DC-operated load terminals, and storing the energy storage region dynamic energy level unit; and A low-voltage direct supply safety protection and stabilization unit used for monitoring an electricity consumption state of the load terminals, performing safety protection on the load terminals, and realizing balanced and stable inter-regional power supply of power supply terminals in a region.

The working principle of the above technical solution is as follows: the safety low-voltage electric appliance supplied with power by an energy storage system comprises the multi-energy power supply monitoring and recognizing unit used for integrating power interfaces for multi-energy power supply, and monitoring and tracking a multi-energy state, the energy storage region dynamic energy level unit used for dividing a multi-energy storage region into energy storage regions in terms of an energy storage form and specification, and adjusting energy levels of the dynamic energy storage regions based on power supply state analysis, the multi-energy power supply and storage conversion unit used for controlling electric energy transmission, converting electric energy of the multi-energy power supply into electric energy needed by DC-operated load terminals, and storing the energy storage region dynamic energy level unit, and the low-voltage direct supply safety protection and stabilization unit used for monitoring an electricity consumption state of the load terminals, performing safety protection on the load terminals, and realizing balanced and stable inter-regional power supply of power supply terminals in a region.

The above technical solution has the following beneficial effects: the safety low-voltage electric appliance supplied with power by an energy storage system comprises the multi-energy power supply monitoring and recognizing unit used for integrating power interfaces for multi-energy power supply, and monitoring and tracking a multi-energy state, the energy storage region dynamic energy level unit used for dividing a multi-energy storage region into energy storage regions in terms of an energy storage form and specification, and adjusting energy levels of the dynamic energy storage regions based on power supply state analysis, the multi-energy power supply and storage conversion unit used for controlling electric energy transmission, converting electric energy of the multi-energy power supply into electric energy needed by DC-operated load terminals, and storing the energy storage region dynamic energy level unit, and the low-voltage direct supply safety protection and stabilization unit used for monitoring an electricity consumption state of the load terminals, performing safety protection on the load terminals, and realizing balanced and stable inter-regional power supply of power supply terminals in a region; an energy storage system with safety voltage may be used for supplying power, the energy storage system may be one or a combination of electrochemical energy storage systems such as a solar power generation system, a wind power generation system, and a tidal power generation system, an independent storage battery/mains supply may be used for charging, or both the mains supply and the energy storage system may be used for complementation; the load terminals not only comprise lamps, but also can be expanded to various electric products; the low-voltage electric appliance does not need an independent external or internal mains supply-to-low voltage conversion circuit, and can be realized by means of a low voltage-to-low voltage conversion circuit, thus being lower in cost, more reliable, and safer; and it is unnecessary to invert the voltage of the energy storage system into mains supply and then convert the mains supply into low voltage, so the use efficiency of the electric energy of the low-voltage energy storage system is high.

In one embodiment, the multi-energy power supply monitoring and recognizing unit comprises:
A multi-energy integrated interface sub-unit used for integrating the power interfaces for the multi-energy power supply to obtain a multi-energy integrated interface;
An energy power supply state detection sub-unit used for detecting an energy power supply state of the multi-energy integrated interface to obtain energy power supply state detection information; and
A multi-energy monitoring, recognizing and tracking sub-unit used for recognizing the energy power supply state detection information, and monitoring and tracking the multi-energy state.

The working principle of the above technical solution is as follows: the multi-energy power supply monitoring and recognizing unit comprises:
The multi-energy integrated interface sub-unit used for integrating the power interfaces for the multi-energy power supply to obtain a multi-energy integrated interface;
The energy power supply state detection sub-unit used for detecting an energy power supply state of the multi-energy integrated interface to obtain energy power supply state detection information; and
The multi-energy monitoring, recognizing and tracking sub-unit used for recognizing the energy power supply state detection information, and monitoring and tracking the multi-energy state.

The above technical solution has the following beneficial effects: the multi-energy power supply monitoring and recognizing unit comprises the multi-energy integrated interface sub-unit used for integrating the power interfaces for the multi-energy power supply to obtain a multi-energy integrated interface, the energy power supply state detection sub-unit used for detecting an energy power supply state of the multi-energy integrated interface to obtain energy power supply state detection information, and the multi-energy monitoring, recognizing and tracking sub-unit used for recognizing the energy power supply state detection information, and monitoring and tracking the multi-energy state; and an energy storage system with safety voltage may be used for supplying power, the energy storage system may be one or a combination of electrochemical energy storage systems such as a solar power generation system, a wind power generation system, and a tidal power generation system.

In one embodiment, the energy storage region dynamic energy level unit comprises:
A multi-energy storage region planning sub-unit used for dividing the multi-energy storage region in terms of the energy storage form and specification to obtain the dynamic energy storage regions;
An energy storage region peak-valley analysis sub-unit used for detecting a peak-valley power supply state of the multi-energy power supply, and performing power supply state analysis on the peak-valley power supply state; and
A dynamic region energy level adjustment sub-unit used for adjusting the energy levels of the dynamic energy storage regions based on the power supply state analysis.

The working principle of the above technical solution is as follows: the energy storage region dynamic energy level unit comprises:
The multi-energy storage region planning sub-unit used for dividing the multi-energy storage region in terms of the energy storage form and specification to obtain the dynamic energy storage regions;
The energy storage region peak-valley analysis sub-unit used for detecting a peak-valley power supply state of the multi-energy power supply, and performing power supply state analysis on the peak-valley power supply state; and The dynamic region energy level adjustment sub-unit used for adjusting the energy levels of the dynamic energy storage regions based on the power supply state analysis.

The above technical solution has the following beneficial effects: the energy storage region dynamic energy level unit comprises the multi-energy storage region planning sub-unit used for dividing the multi-energy storage region in terms of the energy storage form and specification to obtain the dynamic energy storage regions, the energy storage region peak-valley analysis sub-unit used for detecting a peak-valley power supply state of the multi-energy power supply, and performing power supply state analysis on the peak-valley power supply state, and the dynamic region energy level adjustment sub-unit used for adjusting the energy levels of the dynamic energy storage regions based on the power supply state analysis; and an independent storage battery/mains supply may be used for charging, and the dynamic energy storage regions are more reasonable and efficient.

In one embodiment, the multi-energy power supply and storage conversion unit:

A multi-energy power supply energy transmission sub-unit used for transmitting the electric energy of the multi-energy power supply to the energy storage region dynamic energy level unit, and transmitting electric energy stored in the energy storage region dynamic energy level unit to the load terminals;

A supply and storage conversion control center sub-unit used for controlling electric energy transmission of the multi-energy power supply energy transmission sub-unit and a direct-supply energy storage and power supply conversion sub-unit; and The direct-supply energy storage and power supply conversion sub-unit used for converting the electric energy of the multi-energy power supply into the electric energy needed by the DC-operated load terminals according to the control of the supply and storage conversion control center sub-unit, and storing the energy storage region dynamic energy level unit.

The working principle of the above technical solution is as follows: the multi-energy power supply and storage conversion unit comprises:

The multi-energy power supply energy transmission sub-unit used for transmitting the electric energy of the multi-energy power supply to the energy storage region dynamic energy level unit, and transmitting electric energy stored in the energy storage region dynamic energy level unit to the load terminals;

The supply and storage conversion control center sub-unit used for controlling electric energy transmission of the multi-energy power supply energy transmission sub-unit and a direct-supply energy storage and power supply conversion sub-unit; and The direct-supply energy storage and power supply conversion sub-unit used for converting the electric energy of the multi-energy power supply into the electric energy needed by the DC-operated load terminals according to the control of the supply and storage conversion control center sub-unit, and storing the energy storage region dynamic energy level unit.

The above technical solution has the following beneficial effects: the multi-energy power supply and storage conversion unit comprises the multi-energy power supply energy transmission sub-unit used for transmitting the electric energy of the multi-energy power supply to the energy storage region dynamic energy level unit, and transmitting electric energy stored in the energy storage region dynamic energy level unit to the load terminals, the supply and storage conversion control center sub-unit used for controlling electric energy transmission of the multi-energy power supply energy transmission sub-unit and a direct-supply energy storage and power supply conversion sub-unit, and the direct-supply energy storage and power supply conversion sub-unit used for converting the electric energy of the multi-energy power supply into the electric energy needed by the DC-operated load terminals according to the control of the supply and storage conversion control center sub-unit, and storing the energy storage region dynamic energy level unit; and the low-voltage electric appliance does not need an independent external or internal mains supply-to-low voltage conversion circuit.

In one embodiment, the low-voltage direct supply safety protection and stabilization unit comprises:

A load terminal monitoring and feedback sub-unit used for monitoring the electricity consumption state of the load terminals, and feeding a monitoring result back to the multi-energy power supply and storage conversion unit;

A terminal low-voltage direct supply safety protection sub-unit used for performing safety protection on the load terminals according to power supply of the multi-energy power supply and storage conversion unit; and A terminal region power supply stabilization sub-unit used for realizing balanced and stable inter-regional power supply of the power supply terminals in the region.

The working principle of the above technical solution is as follows: the low-voltage direct supply safety protection and stabilization unit comprises:

The load terminal monitoring and feedback sub-unit used for monitoring the electricity consumption state of the load terminals, and feeding a monitoring result back to the multi-energy power supply and storage conversion unit;

The terminal low-voltage direct supply safety protection sub-unit used for performing safety protection on the load terminals according to power supply of the multi-energy power supply and storage conversion unit; and The terminal region power supply stabilization sub-unit used for realizing balanced and stable inter-regional power supply of the power supply terminals in the region.

The above technical solution has the following beneficial effects: the low-voltage direct supply safety protection and stabilization unit comprises the load terminal monitoring and feedback sub-unit used for monitoring the electricity consumption state of the load terminals, and feeding a monitoring result back to the multi-energy power supply and storage conversion unit, the terminal low-voltage direct supply safety protection sub-unit used for performing safety protection on the load terminals according to power supply of the multi-energy power supply and storage conversion unit, and the terminal region power supply stabilization sub-unit used for realizing balanced and stable inter-regional power supply of the power supply terminals in the region; and the use efficiency of electric energy is high.

In one embodiment, the multi-energy integrated interface sub-unit comprises:

A multi-energy power supply connection sub-unit to be connected to an electric-physical-chemical energy storage system to obtain a multi-energy power supply connection, the multi-energy power supply connection comprising a solar power generation connection, a wind power generation connection, and a tidal power generation connection;

A battery input power supply connection sub-unit to be connected to an input terminal of a storage battery with an end passing through and being connected to a charging control and protection circuit; and A multi-energy power generation integrated interface sub-unit used for integrating the multi-energy power supply connection, the input terminal of the storage battery, and initial input terminals of the load terminals to a uniform interface to form a multi-energy power generation integrated interface.

The working principle of the above technical solution is as follows: the multi-energy integrated interface sub-unit comprises:

The multi-energy power supply connection sub-unit to be connected to an electric-physical-chemical energy storage system to obtain a multi-energy power supply connection, the multi-energy power supply connection comprising a solar power generation connection, a wind power generation connection, and a tidal power generation connection;

The battery input power supply connection sub-unit to be connected to an input terminal of a storage battery with an end passing through and being connected to a charging control and protection circuit; and The multi-energy power generation integrated interface sub-unit used for integrating the multi-energy power supply connection, the input terminal of the storage battery, and initial input terminals of the load terminals to a uniform interface to form a multi-energy power generation integrated interface.

The above technical solution has the following beneficial effects: the multi-energy integrated interface sub-unit comprises the multi-energy power supply connection sub-unit to be connected to an electric-physical-chemical energy storage system to obtain a multi-energy power supply connection, the multi-energy power supply connection comprising a solar power generation connection, a wind power generation connection, and a tidal power generation connection; the battery input power supply connection sub-unit to be connected to an input terminal of a storage battery with an end passing through and being connected to a charging control and protection circuit; and the multi-energy power generation integrated interface sub-unit used for integrating the multi-energy power supply connection, the input terminal of the storage battery, and initial input terminals of the load terminals to a uniform interface to form a multi-energy power generation integrated interface.

In one embodiment, the multi-energy monitoring, recognizing and tracking sub-unit comprises:

An energy power supply recognizing and storage sub-unit used for recognizing the energy power supply state detection information, and transmitting multi-energy power to a storage battery of a low-voltage energy storage system through a low voltage-to-low voltage conversion circuit according to a recognized power supply type;

A low-voltage energy storage moving and adjusting sub-unit used for dynamically moving and adjusting the low-voltage energy storage system when the multi-energy power supply state is "in urgent need"; and A process multi-energy monitoring and tracking sub-unit used for monitoring and tracking the multi-energy state in the process of transmitting the electric energy of the multi-energy power supply to the storage battery of the low-voltage energy storage system and dynamically moving and adjusting the low-voltage energy storage system.

The working principle of the above technical solution is as follows: the multi-energy monitoring, recognizing and tracking sub-unit comprises:

The energy power supply recognizing and storage sub-unit used for recognizing the energy power supply state detection information, and transmitting multi-energy power to a storage battery of a low-voltage energy storage system through a low voltage-to-low voltage conversion circuit according to a recognized power supply type;

The low-voltage energy storage moving and adjusting sub-unit used for dynamically moving and adjusting the low-voltage energy storage system when the multi-energy power supply state is "in urgent need"; and The process multi-energy monitoring and tracking sub-unit used for monitoring and tracking the multi-energy state in the process of transmitting the electric energy of the multi-energy power supply to the storage battery of the low-voltage energy storage system and dynamically moving and adjusting the low-voltage energy storage system.

The above technical solution has the following beneficial effects: the multi-energy monitoring, recognizing and tracking sub-unit comprises the energy power supply recognizing and storage sub-unit used for recognizing the energy power supply state detection information, and transmitting multi-energy power to a storage battery of a low-voltage energy storage system through a low voltage-to-low voltage conversion circuit according to a recognized power supply type, the low-voltage energy storage moving and adjusting sub-unit used for dynamically moving and adjusting the low-voltage energy storage system when the multi-energy power supply state is "in urgent need", and the process multi-energy monitoring and tracking sub-unit used for monitoring and tracking the multi-energy state in the process of transmitting the electric energy of the multi-energy power supply to the storage battery of the low-voltage energy storage system and dynamically moving and adjusting the low-voltage energy storage system.

In one embodiment, the multi-energy storage region planning sub-unit comprises:

A feature-based energy storage region sub-unit used for establishing feature-based energy storage regions according to features of the multi-energy power supply, the feature-based storage regions comprising a solar feature-based energy storage region, a wind feature-based energy storage region, and a tidal feature-based energy storage region;

A region specification-based energy storage region dividing unit used for dividing the feature-based energy storage regions into adjustable energy storage regions in terms of an energy region specification; and An energy fluctuation dynamic adjustment sub-unit used for dynamically adjusting the adjustable energy storage regions by an energy fluctuation law to obtain the dynamic energy storage regions, a feature-based energy storage region division coefficient being calculated by the following formula:

$$Heik = \frac{\sum_{k=1}^{Wek}(Uk - Uko) + \sum_{k=1}^{Wei}(Vi - Vio)}{Weik * Pek * Qei}$$

Where, Heik is the feature-based energy storage region division coefficient, Weik is the total number of energy storage sites of a group of obtained feature-based energy storage regions, Uk is an error value of a $k^{th}$ energy storage site of a first feature-based energy storage region, Uko is an average magnitude of error of the $k^{th}$ energy storage site of the first feature-based energy storage region, Vi is an error value of an $i^{th}$ energy storage site of a second feature-based energy storage region, Vio is an average magnitude of error of the $i^{th}$ energy storage site of the second feature-based energy storage region, and Pek is a standard deviation between Uk and Uko, and Qei is a standard deviation between Vi and Vio; by calculating the feature-based energy storage region division coefficient, the feature-based energy storage regions can be divided based on analysis and determination closer to actual energy features.

The working principle of the above technical solution is as follows: the multi-energy storage region planning sub-unit comprises:

The feature-based energy storage region sub-unit used for establishing feature-based energy storage regions according to features of the multi-energy power supply, the feature-based storage regions comprising a solar feature-based energy storage region, a wind feature-based energy storage region, and a tidal feature-based energy storage region;

The region specification-based energy storage region dividing unit used for dividing the feature-based energy storage regions into adjustable energy storage regions in terms of an energy region specification; and The energy fluctuation dynamic adjustment sub-unit used for dynamically adjusting the adjustable energy storage regions by an energy fluctuation law to obtain the dynamic energy storage regions, a feature-based energy storage region division coefficient being calculated by the following formula:

$$Heik = \frac{\sum_{k=1}^{Wek}(Uk - Uko) + \sum_{k=1}^{Wei}(Vi - Vio)}{Weik * Pek * Qei}$$

Where, Heik is the feature-based energy storage region division coefficient, Weik is the total number of energy storage sites of a group of obtained feature-based energy storage regions, Uk is an error value of a $k^{th}$ energy storage site of a first feature-based energy storage region, Uko is an average magnitude of error of the $k^{th}$ energy storage site of the first feature-based energy storage region, Vi is an error value of an $i^{th}$ energy storage site of a second feature-based energy storage region, Vio is an average magnitude of error of the $i^{th}$ energy storage site of the second feature-based energy storage region, and Pek is a standard deviation between Uk and Uko, and Qei is a standard deviation between Vi and Vio; by calculating the feature-based energy storage region division coefficient, the feature-based energy storage regions can be divided based on analysis and determination closer to actual energy features; and with the increase of the feature-based energy storage region division coefficient, the feature-based energy storage regions can be divided closer to the actual energy features.

The above technical solution has the following beneficial effects: the multi-energy storage region planning sub-unit comprises the feature-based energy storage region sub-unit used for establishing feature-based energy storage regions according to features of the multi-energy power supply, the feature-based storage regions comprising a solar feature-based energy storage region, a wind feature-based energy storage region, and a tidal feature-based energy storage region; the region specification-based energy storage region dividing unit used for dividing the feature-based energy storage regions into adjustable energy storage regions in terms of an energy region specification; and the energy fluctuation dynamic adjustment sub-unit used for dynamically adjusting the adjustable energy storage regions by an energy fluctuation law to obtain the dynamic energy storage regions, a feature-based energy storage region division coefficient being calculated; where, Heik is the feature-based energy storage region division coefficient, Weik is the total number of energy storage sites of a group of obtained feature-based energy storage regions, Uk is an error value of a $k^{th}$ energy storage site of a first feature-based energy storage region, Uko is an average magnitude of error of the $k^{th}$ energy storage site of the first feature-based energy storage region, Vi is an error value of an $i^{th}$ energy storage site of a second feature-based energy storage region, Vio is an average magnitude of error of the $i^{th}$ energy storage site of the second feature-based energy storage region, and Pek is a standard deviation between Uk and Uko, and Qei is a standard deviation between Vi and Vio; and the feature-based energy storage region division coefficient is calculated, and with the increase of the feature-based energy storage region division coefficient, the feature-based energy storage regions can be divided closer to the actual energy features, and the division of the feature-based energy storage regions is optimized.

In one embodiment, the supply and storage conversion control center sub-unit comprises:

An electric energy multi-way transmission sub-unit used for realizing multi-way transmission of electric energy of the multi-energy power supply energy transmission sub-unit, the multi-way transmission comprising multi-path transmission, multi-relay point transmission, long-distance transmission and short-distance transmission;

A transmission center sub-unit used for establishing a transmission center for the multi-way transmission, the transmission center comprising a multi-path transmission center, a multi-relay point transmission center, a long-distance transmission center and a short-distance transmission center; and A power supply conversion central control sub-unit used for central control of the direct-supply energy storage and power supply conversion sub-unit, and comprising multiple energy storage region dynamic current transformers, multiple distributed energy storage controllers and a central controller, wherein the central controller communicates with the multiple distributed energy storage controllers; each energy storage region dynamic current transformer comprises a central transformation unit and at least one dynamic energy storage region, the dynamic energy storage region comprises a first adjustable energy storage region, a second adjustable energy storage region, a first gate thyristor group and a second gate thyristor group, the first gate thyristor group is connected in series between the first adjustable energy storage region and a DC side of a power electronic transformation unit, and the first adjustable energy storage region and the power electronic transformation unit are connected or disconnected by controlling forward on-off and reverse on-off of the first gate thyristor group; the second gate thyristor group is connected in series between the power electronic transformation unit and a DC grid, and the power electronic transformation unit and the DC grid are connected or disconnected by controlling forward on-off and reverse on-off of the second gate thyristor group; and the second adjustable energy storage region and the first adjustable energy storage region are connected in parallel with the first gate thyristor group.

The working principle of the above technical solution is as follows: the electric energy multi-way transmission sub-unit is used for realizing multi-way transmission of electric energy of the multi-energy power supply energy transmission sub-unit, and the multi-way transmission comprises multi-path transmission, multi-relay point transmission, long-distance transmission and short-distance transmission; the transmission center sub-unit is used for establishing a transmission center for the multi-way transmission, and the transmission center comprises a multi-path transmission center, a multi-relay point transmission center, a long-distance transmission center and a short-distance transmission center; the power supply conversion central control sub-unit is used for central control of the direct-supply energy storage and power supply conversion sub-unit, and comprises multiple energy storage region dynamic current transformers, multiple distributed energy storage controllers and a central controller, wherein the central controller communicates with the multiple distributed energy storage controllers; each energy storage region dynamic current transformer comprises a central transformation unit and at least one dynamic energy storage region, the dynamic energy storage region comprises a first adjustable energy storage region, a second adjustable energy storage region, a first gate thyristor group and a second gate thyristor group, the first gate thyristor group is connected in series between the first adjustable energy storage region and a DC side of a power electronic transformation unit, and the first adjustable energy storage region and the power electronic transformation unit are connected or disconnected by controlling forward on-off and reverse on-off of the first gate thyristor group; the second gate thyristor group is connected in series between the power electronic transformation unit and a DC grid, and the power electronic transformation unit and the DC grid are connected or disconnected by controlling forward on-off and reverse on-off of the second gate thyristor group; and the second adjustable energy storage region and the first adjustable energy storage region are connected in parallel with the first gate thyristor group.

The above technical solution has the following beneficial effects: the supply and storage conversion control center sub-unit comprises the electric energy multi-way transmission sub-unit used for realizing multi-way transmission of electric energy of the multi-energy power supply energy transmission sub-unit, the multi-way transmission comprising multi-path transmission, multi-relay point transmission, long-distance transmission and short-distance transmission; the transmission center sub-unit used for establishing a transmission center for the multi-way transmission, the transmission center comprising a multi-path transmission center, a multi-relay point transmission center, a long-distance transmission center and a short-distance transmission center; and the power supply conversion central control sub-unit used for central control of the direct-supply energy storage and power supply conversion sub-unit, and comprising multiple energy storage region dynamic current transformers, multiple distributed energy storage controllers and a central controller, wherein the central controller communicates with the multiple distributed energy storage controllers; each energy storage region dynamic current transformer comprises a central transformation unit and at least one dynamic energy storage region, the dynamic energy storage region comprises a first adjustable energy storage region, a second adjustable energy storage region, a first gate thyristor group and a second gate thyristor group, the first gate thyristor group is connected in series between the first adjustable energy storage region and a DC side of a power electronic transformation unit, and the first adjustable energy storage region and the power electronic transformation unit are connected or disconnected by controlling forward on-off and reverse on-off of the first gate thyristor group; the second gate thyristor group is connected in series between the power electronic transformation unit and a DC grid, and the power electronic transformation unit and the DC grid are connected or disconnected by controlling forward on-off and reverse on-off of the second gate thyristor group; the second adjustable energy storage region and the first adjustable energy storage region are connected in parallel with the first gate thyristor group; and an energy storage system with safety voltage may be used for supplying power, the energy storage system may be one or a combination of electrochemical energy storage systems such as a solar power generation system, a wind power generation system, and a tidal power generation system, an independent storage battery/mains supply may be used for charging, or both the mains supply and the energy storage system may be used for complementation.

In one embodiment, the terminal region power supply stabilization sub-unit comprises:

A regional power supply sub-unit used for regional power supply to the power supply terminal in the region;

A regional power supply switching sub-unit used for inter-regional power supply switching of the regional power supply; and A regional power supply balancing sub-unit used for realizing balanced and stable inter-regional power supply during the inter-regional power supply switching process, and comprising multiple groups of input terminals, multiple groups of energy storage inductors, a centralized and decentralized reference ground potential terminal, multiple groups of thyristors, a bidirectional rectifying circuit, multiple groups of energy storage regions, and a one-superior and multi-inferior control center, wherein each group of input terminals is connected to multiple power supply regions; the multiple groups of energy storage inductors are connected to the multiple groups of input terminals respectively to store and release electric energy; the centralized and decentralized reference ground potential lterminal is connected to the multiple power supply regions; the multiple groups of thyristors correspond to the multiple groups of energy storage inductors respectively, one end of each group of thyristors is electrically connected to the other end, other than the end connected to the corresponding input terminal, of the corresponding energy storage inductor, and the other end of each group of thyristors is electrically connected to the reference ground potential terminal; the bidirectional rectifying circuit is electrically connected to a connection node of the multiple groups of thyristors and the corresponding energy storage inductor; each energy storage region has a positive collection terminal and a negative collection terminal, the negative collection terminal of one energy storage region is connected to the positive collection terminal of another energy storage region through a controllable switch to form the connection node, which is connected to the reference ground potential terminal, and the positive collection terminals and negative collection terminals, that are not connected, of the multiple groups of energy storage regions are connected to the multiple groups of thyristors through the bidirectional rectifying circuit; the one-superior and multi-inferior control center is connected to the multiple groups of thyristors, and enables the multiple groups of energy storage inductors to store electric energy from the multiple groups of input terminals and release electric energy to the corresponding energy storage regions by turning on or off the multiple groups of thyristors; when electric energy in one energy storage regions is sufficient, the corresponding group of thyristors is turned off; when electric energy in one energy storage regions is sufficient and electric energy is needed by the load terminals, the corresponding group of thyristors is controlled to be turned on reversely, and then, the energy storage region releases electric energy to the load terminals, such that balanced and stable inter-regional power supply is realized during the switching process.

The working principle of the above technical solution is as follows: the regional power supply sub-unit is used for regional power supply to the power supply terminal in the region; the regional power supply switching sub-unit is used for inter-regional power supply switching of the regional power supply; the regional power supply balancing sub-unit is used for realizing balanced and stable inter-regional power supply during the inter-regional power supply switching process, and comprise multiple groups of input terminals, multiple groups of energy storage inductors, a centralized and decentralized reference ground potential terminal, multiple groups of thyristors, a bidirectional rectifying circuit, multiple groups of energy storage regions, and a one-superior and multi-inferior control center, wherein each group of input terminals is connected to multiple power supply regions; the multiple groups of energy storage inductors are connected to the multiple groups of input terminals respectively to store and release electric energy; the centralized and decentralized reference ground potential terminal is connected to the multiple power supply regions; the multiple groups of thyristors correspond to the multiple groups of energy storage inductors respectively, one end of each group of thyristors is electrically connected to the other end, other than the end connected to the corresponding input terminal, of the corresponding energy storage inductor, and the other end of each group of thyristors is electrically connected to the reference ground potential terminal; the bidirectional rectifying circuit is electrically connected to a connection node of the multiple groups of thyristors and the corresponding energy storage inductor; each energy storage region has a positive collection terminal and a negative collection terminal, the negative collection terminal of one energy storage region is connected to the positive collection terminal of another energy storage region through a controllable switch to form the connection node, which is connected to the reference ground potential terminal, and the positive collection terminals and negative collection terminals, that are not connected, of the multiple groups of energy storage regions are connected to the multiple groups of thyristors through the bidirectional rectifying circuit; the one-superior and multi-inferior control center is connected to the multiple groups of thyristors, and enables the multiple groups of energy storage inductors to store electric energy from the multiple groups of input terminals and release electric energy to the corresponding energy storage regions by turning on or off the multiple groups of thyristors; when electric energy in one energy storage regions is sufficient, the corresponding group of thyristors is turned off; when electric energy in one energy storage regions is sufficient and electric energy is needed by the load terminals, the corresponding group of thyristors is controlled to be turned on reversely, and then, the energy storage region releases electric energy to the load terminals, such that balanced and stable inter-regional power supply is realized during the switching process.

The above technical solution has the following beneficial effects: the terminal region power supply stabilization sub-unit comprises the regional power supply sub-unit used for regional power supply to the power supply terminal in the region; the regional power supply switching sub-unit used for inter-regional power supply switching of the regional power supply; and the regional power supply balancing sub-unit used for realizing balanced and stable inter-regional power supply during the inter-regional power supply switching process, and comprising multiple groups of input terminals, multiple groups of energy storage inductors, a centralized and decentralized reference ground potential terminal, multiple groups of thyristors, a bidirectional rectifying circuit, multiple groups of energy storage regions, and a one-superior and multi-inferior control center, wherein each group of input terminals is connected to multiple power supply regions; the multiple groups of energy storage inductors are connected to the multiple groups of input terminals respectively to store and release electric energy; the centralized and decentralized reference ground potential terminal is connected to the multiple power supply regions; the multiple groups of thyristors correspond to the multiple groups of energy storage inductors respectively, one end of each group of thyristors is electrically connected to the other end, other than the end connected to the corresponding input terminal, of the corresponding energy storage inductor, and the other end of each group of thyristors is electrically connected to the reference ground potential terminal; the bidirectional rectifying circuit is electrically connected to a connection node of the multiple groups of thyristors and the corresponding energy storage inductor; each energy storage region has a positive collection terminal and a negative collection terminal, the negative collection terminal of one energy storage region is connected to the positive collection terminal of another energy storage region through a controllable switch to form the connection node, which is connected to the reference ground potential terminal, and the positive collection terminals and negative collection terminals, that are not connected, of the multiple groups of energy storage regions are connected to the multiple groups of thyristors through the bidirectional rectifying circuit; the one-superior and multi-inferior control center is connected to the multiple groups of thyristors, and enables the multiple groups of energy storage inductors to store electric energy from the multiple groups of input terminals and release electric energy to the corresponding energy storage regions by turning on or off the multiple groups of thyristors; when electric energy in one energy storage regions is sufficient, the corresponding group of thyristors is turned off; when electric energy in one energy storage regions is sufficient and electric energy is needed by the load terminals, the corresponding group of thyristors is controlled to be turned on reversely, and then, the energy storage region releases electric energy to the load terminals, such that balanced and stable inter-regional power supply is realized during the switching process; and the low-voltage electric appliance can be realized by means of a low voltage-to-low voltage conversion circuit, thus being lower in cost, more reliable, and safer.

Although the embodiments of the invention have been disclosed above, the invention is not limited to the use in the specification and embodiments, and can also be applied to various suitable fields. Any skilled in the art can easily make modifications to the invention without departing from the general concept defined by the claims and their equivalents, and the invention is not limited to specific details and drawings illustrated and described here.

What is claimed is:

1. A safety low-voltage electric appliance with an energy storage system for outputting a low-voltage power supply, comprising:
a multi-energy power supply monitoring and recognizing module for integrating power interfaces for multi-energy power supply, and monitoring and tracking a multi-energy state; an energy storage region dynamic energy level module for dividing a multi-energy storage region into energy storage regions in terms of an energy storage form and specification, and adjusting energy levels of the dynamic energy storage regions based on power supply state analysis; a multi-energy power supply and storage conversion module for controlling electric energy transmission, converting electric energy of the multi-energy power supply into electric energy needed by DC-operated load terminals, and storing the energy storage region dynamic energy level module; and
a low-voltage direct supply safety protection and stabilization module for monitoring an electricity consumption state of the load terminals, performing safety protection on the load terminals, and realizing balanced and stable inter-regional power supply of power supply terminals in a region; wherein,
the multi-energy power supply and storage conversion module comprises:
a multi-energy power supply energy transmission sub-module for transmitting the electric energy of the multi-energy power supply to the energy storage region dynamic energy level module, and transmitting electric energy stored in the energy storage region dynamic energy level module to the load terminals;
a supply and storage conversion control center sub-module for controlling electric energy transmission of the multi-energy power supply energy transmission sub-module and a direct-supply energy storage and power supply conversion sub-module; and
the direct-supply energy storage and power supply conversion sub-module for converting the electric energy of the multi-energy power supply into the electric energy needed by the DC-operated load terminals according to the control of the supply and storage conversion control center sub-module, and storing the energy storage region dynamic energy level module;
the supply and storage conversion control center sub-module comprises:
an electric energy multi-way transmission sub-module used for realizing multi-way transmission of electric energy of the multi-energy power supply energy transmission sub-module, the multi-way transmission comprising multi-path transmission, multi-relay point transmission, long-distance transmission and short-distance transmission;
a transmission center sub-module for establishing a transmission center for the multi-way transmission, the transmission center comprising a multi-path transmission center, a multi-relay point transmission center, a long-distance transmission center and a short-distance transmission center;
a power supply conversion central control sub-module for central control of the direct-supply energy storage and power supply conversion sub-module, and comprising multiple energy storage region dynamic current transformers, multiple distributed energy storage controllers and a central controller, wherein the central controller communicates with the multiple distributed energy storage controllers; each said energy storage region dynamic current transformer comprises a central transformation module and at least one dynamic energy storage region, the dynamic energy storage region comprises a first adjustable energy storage region, a second adjustable energy storage region, a first gate thyristor group and a second gate thyristor group, the first gate thyristor group is connected in series between the first adjustable energy storage region and a DC side of a power electronic transformation module, and the first adjustable energy storage region and the power electronic transformation module are connected or disconnected by controlling forward on-off and reverse on-off of the first gate thyristor group; the second gate thyristor group is connected in series between the power electronic transformation module and a DC grid, and the power electronic transformation module and the DC grid are connected or disconnected by controlling forward on-off and reverse on-off of the second gate thyristor group; and the second adjustable energy storage region and the first adjustable energy storage region are connected in parallel with the first gate thyristor group.

2. The safety low-voltage electric appliance with an energy storage system for outputting a low-voltage power supply according to claim 1, wherein the multi-energy power supply monitoring and recognizing module comprises:
a multi-energy integrated interface sub-module for integrating the power interfaces for the multi-energy power supply to obtain a multi-energy integrated interface;
an energy power supply state detection sub-module for detecting an energy power supply state of the multi-energy integrated interface to obtain energy power supply state detection information; and
a multi-energy monitoring, recognizing and tracking sub-module for recognizing the energy power supply state detection information, and monitoring and tracking the multi-energy state.

3. The safety low-voltage electric appliance with an energy storage system for outputting a low-voltage power supply according to claim 1, wherein the energy storage region dynamic energy level module comprises:
a multi-energy storage region planning sub-module used for dividing the multi-energy storage region in terms of the energy storage form and specification to obtain the dynamic energy storage regions;
an energy storage region peak-valley analysis sub-module used for detecting a peak-valley power supply state of the multi-energy power supply, and performing power supply state analysis on the peak-valley power supply state; and
a dynamic region energy level adjustment sub-module used for adjusting the energy levels of the dynamic energy storage regions based on the power supply state analysis.

4. The safety low-voltage electric appliance with an energy storage system for outputting a low-voltage power supply according to claim 1, wherein the low-voltage direct supply safety protection and stabilization module comprises:
- a load terminal monitoring and feedback sub-module used for monitoring the electricity consumption state of the load terminals, and feeding a monitoring result back to the multi-energy power supply and storage conversion module;
- a terminal low-voltage direct supply safety protection sub-module used for performing safety protection on the load terminals according to power supply of the multi-energy power supply and storage conversion module; and
- a terminal region power supply stabilization module used for realizing balanced and stable inter-regional power supply of the power supply terminals in the region.

5. The safety low-voltage electric appliance with an energy storage system for outputting a low-voltage power supply according to claim 2, wherein the multi-energy integrated interface sub-module comprises:
- a multi-energy power supply connection sub-module to be connected to an electric-physical-chemical energy storage system to obtain a multi-energy power supply connection, the multi-energy power supply connection comprising a solar power generation connection, a wind power generation connection, and a tidal power generation connection;
- a battery input power supply connection sub-module to be connected to an input terminal of a storage battery with an end passing through and being connected to a charging control and protection circuit; and
- a multi-energy power generation integrated interface sub-module used for integrating the multi-energy power supply connection, the input terminal of the storage battery, and initial input terminals of the load terminals to a uniform interface to form a multi-energy power generation integrated interface.

6. The safety low-voltage electric appliance with an energy storage system for outputting a low-voltage power supply according to claim 2, wherein the multi-energy monitoring, recognizing and tracking sub-module comprises:
- an energy power supply recognizing and storage sub-module used for recognizing the energy power supply state detection information, and transmitting multi-energy power to a storage battery of a low-voltage energy storage system through a low voltage-to-low voltage conversion circuit according to a recognized power supply type;
- a low-voltage energy storage moving and adjusting sub-module used for dynamically moving and adjusting the low-voltage energy storage system when the multi-energy power supply state is "in urgent need"; and
- a process multi-energy monitoring and tracking sub-module used for monitoring and tracking the multi-energy state in the process of transmitting the electric energy of the multi-energy power supply to the storage battery of the low-voltage energy storage system and dynamically moving and adjusting the low-voltage energy storage system.

7. The safety low-voltage electric appliance with an energy storage system for outputting a low-voltage power supply according to claim 3, wherein the multi-energy storage region planning sub-module comprises:
- a feature-based energy storage region sub-module used for establishing feature-based energy storage regions according to features of the multi-energy power supply, the feature-based storage regions comprising a solar feature-based energy storage region, a wind feature-based energy storage region, and a tidal feature-based energy storage region;
- a region specification-based energy storage region dividing module used for dividing the feature-based energy storage regions into adjustable energy storage regions in terms of an energy region specification; and
- an energy fluctuation dynamic adjustment sub-module used for dynamically adjusting the adjustable energy storage regions by an energy fluctuation law to obtain the dynamic energy storage regions.

8. The safety low-voltage electric appliance with an energy storage system for outputting a low-voltage power supply according to claim 4, wherein the terminal region power supply stabilization sub-module comprises:
- a regional power supply sub-module used for regional power supply to the power supply terminal in the region;
- a regional power supply switching sub-module used for inter-regional power supply switching of the regional power supply; and
- a regional power supply balancing sub-module used for realizing balanced and stable inter-regional power supply during the inter-regional power supply switching process, and comprising multiple groups of input terminals, multiple groups of energy storage inductors, a centralized and decentralized reference ground potential terminal, multiple groups of thyristors, a bidirectional rectifying circuit, multiple groups of energy storage regions, and a one-superior and multi-inferior control center, wherein each said group of input terminals is connected to multiple power supply regions; the multiple groups of energy storage inductors are connected to the multiple groups of input terminals respectively to store and release electric energy; the centralized and decentralized reference ground potential terminal is connected to the multiple power supply regions; the multiple groups of thyristors correspond to the multiple groups of energy storage inductors respectively, one end of each said group of thyristors is electrically connected to the other end, other than an end connected to the corresponding input terminal, of the corresponding energy storage inductor, and the other end of each said group of thyristors is electrically connected to the reference ground potential terminal; the bidirectional rectifying circuit is electrically connected to a connection node of the multiple groups of thyristors and the corresponding energy storage inductor; each said energy storage region has a positive collection terminal and a negative collection terminal, the negative collection terminal of one said energy storage region is connected to the positive collection terminal of another said energy storage region through a controllable switch to form the connection node, which is connected to the reference ground potential terminal, and the positive collection terminals and negative collection terminals, that are not connected, of the multiple groups of energy storage regions are connected to the multiple groups of thyristors through the bidirectional rectifying circuit; the one-superior and multi-inferior control center is connected to the multiple groups of thyristors, and enables the multiple groups of energy storage inductors to store electric energy from the multiple groups of input terminals and release electric energy to the corresponding energy storage regions by turning on or off the multiple groups of thyristors; when electric energy in one said energy storage regions is sufficient, the corresponding group of thyristors is turned off; when electric energy in one said energy storage regions is sufficient and electric energy is needed by the load terminals, the corresponding group of thyristors is controlled to be turned on reversely, and then, the energy storage region releases electric energy to the load terminals, such that balanced and stable inter-regional power supply is realized during the switching process.

\* \* \* \* \*